(12) United States Patent
Hamada et al.

(10) Patent No.: US 8,795,804 B2
(45) Date of Patent: Aug. 5, 2014

(54) JOINT STRUCTURE FOR FIBER REINFORCED RESIN AND METAL, AND JOINING METHOD FOR FIBER REINFORCED RESIN AND METAL

(75) Inventors: Keisuke Hamada, Tokyo (JP); Tamotsu Osada, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 91 days.

(21) Appl. No.: 13/402,768

(22) Filed: Feb. 22, 2012

(65) Prior Publication Data

US 2012/0219763 A1  Aug. 30, 2012

(30) Foreign Application Priority Data

Feb. 25, 2011  (JP) ................................. 2011-039656

(51) Int. Cl.
*B32B 3/10* (2006.01)

(52) U.S. Cl.
USPC .......................................................... 428/60

(58) Field of Classification Search
CPC ............................. B32B 3/10; B29C 66/12822
USPC ................................ 428/58, 60; 244/131, 120
See application file for complete search history.

(56) References Cited

U.S. PATENT DOCUMENTS

| | | | | |
|---|---|---|---|---|
| 5,281,454 A | * | 1/1994 | Hanson | ........................ 428/36.3 |
| 6,464,591 B1 | | 10/2002 | Nakajima | |
| 7,875,333 B2 | * | 1/2011 | Stephan | ........................ 428/60 |

FOREIGN PATENT DOCUMENTS

| | | |
|---|---|---|
| JP | 61-9135 (B) | 3/1986 |
| JP | S63-178126 U | 11/1998 |
| JP | 2001-032819 A | 2/2001 |

* cited by examiner

*Primary Examiner* — Alexander Thomas
(74) *Attorney, Agent, or Firm* — McGinn IP Law Group, PLLC

(57) ABSTRACT

There are provided a joint structure for a fiber reinforced resin and a metal, and a joining method for a fiber reinforced resin and a metal. In the joint structure, a plurality of single elements each constituted by a metallic material, which includes a step-shaped structure having an end portion that gradually becomes thinner in a direction of an end surface of the end portion so as to form the step-shaped joint surface, and a fiber reinforced plastic, which is laminated such that end portions thereof cover the step-shaped structure smoothly, are laminated such that the step-shaped structures are superposed in a thickness direction, whereupon the metallic material and the fiber reinforced plastic are adhered to each other and adjacent elements are joined to each other by superposed surfaces thereof. The metallic materials are then welded to each other.

8 Claims, 4 Drawing Sheets

JOINT STRUCTURE FOR FIBER REINFORCED RESIN AND METAL, AND JOINING METHOD FOR FIBER REINFORCED RESIN AND METAL

CROSS-REFERENCE TO RELATED APPLICATIONS

The present application claims priority from Japanese Patent Application No. 2011-039656 filed on Feb. 25, 2011, the entire contents of which are hereby incorporated by reference.

BACKGROUND OF THE INVENTION

1. Field of the Invention

The present invention relates to a joint between a fiber reinforced resin and a metal.

2. Description of the Related Art

Fiber reinforced plastics (FRPs) are today used widely in structural members for aircraft, vehicles, ships, and general industrial instruments. For example, a known structural member is formed by impregnating a woven fabric, which is constituted by inorganic reinforcing fibers such as carbon fibers or glass fibers that are disposed in crisscross arrangement and interwoven, with a resin such as epoxy resin, and then hardening the resin.

In many cases, however, structural members are not formed entirely from fiber reinforced plastics, and a metallic material must be applied partially thereto.

It is therefore necessary to join the fiber reinforced plastic and the metallic material with a high degree of strength.

In techniques proposed in the related art, as described in Japanese Unexamined Utility Model (Registration) Application Publication (JP-UM-A) Nos. S63-178126 and S61-009135, and Japanese Unexamined Patent Application Publication No. 2001-032819, the fiber reinforced plastic is adhered directly to the metallic material, thereby eliminating the need for a fastening tool, and as a result, a reduction in weight and so on are achieved.

In the case where two members are joined by adhesion, if end surfaces of the two members are mated such that a resulting mating surface serves alone as an adhesion surface, the adhesion surface is small, and therefore a large degree of strength cannot be expected from a resulting joint structure.

A joint structure described in JP-UM-A No. S63-178126 employs a step-shaped joint surface obtained by forming complementary step structures on each of the end portions of two members to be joined. As a result, an adhesion surface having a large surface area is secured on a step surface that is perpendicular to the mating surface.

A joint structure described in JP-UM-A No. S61-009135 employs a multi-step-shaped joint surface in a tube material. Further, JP-UM-A No. S61-009135 describes a structure in which the step-shaped joint surfaces are superposed in two layers (see FIG. 3 of JP-UM-A No. 061-009135). In this structure, an end portion of a metallic material formed in a tapered step shape is inserted into a groove formed in a shallow step shape that opens onto an end surface of a fiber reinforced plastic.

In a joint structure described in JJP-A No. 2001-032819, a fiber reinforced plastic and a metallic material are disposed so as to overlap partially and wound together in a shaft material with axial direction ends thereof arranged diagonally. Thus, the two materials are superposed alternately in a plurality of layers on a cross-section passing through an axis thereof.

According to the technique described in JP-A No. 2001-032819, however, although the two materials can be superposed alternately to form a multi-layer structure, it is only possible to form a roll-shaped pipe material, and a planar structure or a structure having a desired curve cannot be formed. Moreover, a step-shaped joint surface, and in particular a multi-step step-shaped joint surface, cannot be formed. Furthermore, as the two materials are wound, a region in which the materials are superposed gradually becomes misaligned in the axial direction such that the region increases in length. It is difficult to form another structure simultaneously in a structural portion used as a joint. Therefore, when the joint structure increases in size, a degree of design freedom is restricted correspondingly. As a result, application locations for the joint structure become limited, which is undesirable.

Furthermore, the technique described in JP-UM-A No. 163-178126 relates to a joint structure formed by superposing a single layer of fiber reinforced plastic and a single layer of metallic material. In the technique described in J JP-UM-A No. S61-009135, the metallic material is not provided in more than two layers.

Hence, with the conventional techniques described above, it is difficult to obtain a structure that is formed by alternately superposing at least two layers each of a fiber reinforced plastic and a metallic material and has a planar shape or a desired curved shape. Moreover, limitations occur naturally in a layer thickness of the layers relative to an overall required thickness, making it difficult to increase the number of layers.

SUMMARY OF THE INVENTION

It is therefore an object of the present invention to provide a joint structure and a joining method for a fiber reinforced resin and a metal, in which end portions thereof are joined via a step-shaped joint surface, with which the step-shaped joint surface can be formed with multiple steps, a fiber reinforced resin layer and a metal layer can be easily superposed alternately via the step-shaped joint surface in a large number of layers while maintaining a low overall thickness, thereby enhancing characteristics such as joint strength, a Length of the step-shaped joint surface can be reduced while maintaining sufficient joint strength, and the joint structure can be formed in a planar shape or any curved shape.

To achieve the object described above, an aspect of the present invention provides a joint structure for a fiber reinforced resin and a metal, in which end portions of a fiber reinforced plastic and a metallic material are joined via a step-shaped joint surface. In the joint structure, a plurality of single elements each constituted by the metallic material, which includes a step-shaped structure having an end portion that gradually becomes thinner in a direction of an end surface of the end portion so as to form the step-shaped joint surface, and the fiber reinforced plastic, which is laminated such that end portions thereof covers the step-shaped structure smoothly, are laminated such that the step-shaped structures are superposed in a thickness direction. The metallic material and the fiber reinforced plastic are adhered to each other, and adjacent elements are joined to each other by superposed surfaces thereof.

Preferably, the metallic material should be disposed on outer surfaces in a region of the step-shaped structure.

Preferably, the adjacent metallic materials are joined to each other by welding.

Preferably, the step-shaped structure includes multiple steps.

Preferably, the end positions of the step-shaped structures of the respective elements are disposed substantially in alignment.

Another aspect of the present invention provides a joining method for a fiber reinforced resin and a metal by which end portions of a fiber reinforced plastic and a metallic material are joined via a step-shaped joint surface. The method includes processes of:

forming a step-shaped structure in which an end portion of the metallic material gradually becomes thinner in a direction of an end surface of the end portion so as to form the step-shaped joint surface;

laminating the fiber reinforced plastic such that end portions thereof cover the step-shaped structure smoothly;

laminating a plurality of single elements each constituted by the metallic material and the fiber reinforced plastic laminated to cover the step-shaped structure such that the step-shaped structures are superposed in a thickness direction;

adhering the metallic material and the fiber reinforced plastic to each other by thermally curing the fiber reinforced plastic; and joining adjacent elements to each other by superposed surfaces thereof.

Preferably, adjacent metallic materials should be welded to each other following the thermal cure.

Preferably, after welding the metallic materials, a metallic component is welded to an end surface constituted by an opposite end of the metallic material to the step-shaped structure.

The present invention provides a structure or a method for laminating a plurality of single elements each constituted by a metallic material that includes a step-shaped structure having an end portion that gradually becomes thinner in a direction of an end surface of the end portion so as to form a step-shaped joint surface, and fiber reinforced plastic laminated such that end portions thereof cover the step-shaped structure smoothly. Therefore, the step-shaped joint surface can be formed with multiple steps, and a fiber reinforced resin layer and a metal layer can be easily superposed alternately via the step-shaped joint surface in a large number of layers while maintaining a low overall thickness. By increasing the number of layers in this manner, a large overall adhesion surface area is secured between the fiber reinforced resin and the metal, thereby enhancing characteristics such as joint strength. Hence, a length of the step-shaped joint surface can be reduced while maintaining sufficient joint strength. Furthermore, the joint structure can be formed not only in a planar shape, and but also in an any curved shape easily by forming a metallic material at a suitable thickness for molding and then simultaneously laminating and molding the elements constituted by the metallic material and the fiber reinforced plastic laminated to cover the step-shaped structure.

DESCRIPTION OF THE PREFERRED EMBODIMENT

An embodiment of the present invention will be described below with reference to the drawings. Note that the present invention is not limited to the following embodiment.

Figure 1:
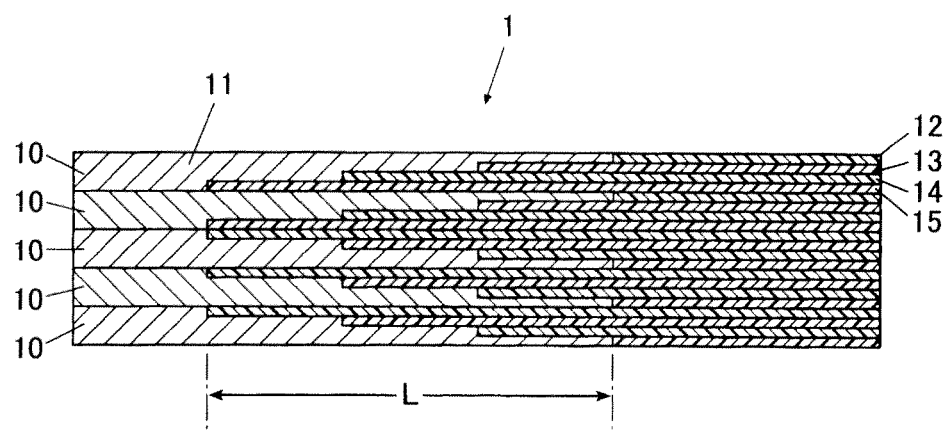
FIG. 1 is a sectional view of a joint structure for a fiber reinforced resin and a metal according to an embodiment of the present invention.
Figure 2:
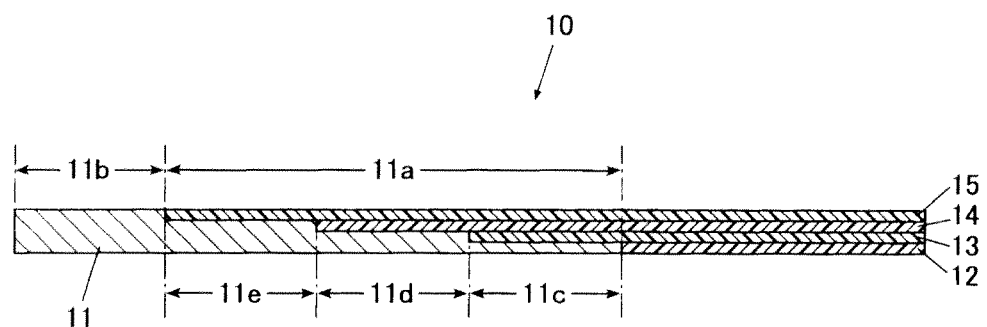
FIG. 2 is a sectional view showing a single element of the joint structure for a fiber reinforced resin and a metal according to this embodiment of the present invention.

As shown in FIG. 1, a joint structure 1 for a fiber reinforced resin and a metal according to this embodiment is formed by laminating a plurality of single elements 10 shown singly in FIG. 2.

The single element 10 is constituted by a metal foil 11 and fiber reinforced plastics 12 to 15. The metal foil 11 and the fiber reinforced plastics 12 to 15 are adhered via a step-shaped joint surface, and the elements 10 are joined by superposed surfaces thereof.

The joint structure 1 will now be described while describing a manufacturing process thereof.

First, as shown in FIG. 2, an end portion 11a of the metal foil 11 is formed with a step-shaped structure that gradually becomes thinner in the direction of an end surface thereof.

Next, the fiber reinforced plastics 12 to 15, which are pre-impregnated by impregnating reinforcing fibers with a matrix resin, are laminated in sequence onto the step-shaped structure on the end portion 11a of the metal foil 11.

The fiber reinforced plastics 12 to 15 are divided for convenience into parts corresponding to steps of the end portion 11a. The fiber reinforced plastics 12 to 15 are each constituted by one or a plurality of pre-pregs.

In the lamination process, first, the fiber reinforced plastic 12 is mated with the end surface of the end portion 11a. An end of the fiber reinforced plastic 13 is then disposed in a position deviating further toward a thickest portion 11b side of the metal foil 11 than the end of the fiber reinforced plastic 12, whereupon the fiber reinforced plastic 13 is laminated such that a first step surface 11c is covered smoothly by the end portion of the fiber reinforced plastic 13. Similarly, an end of the fiber reinforced plastic 14 is disposed in a position deviating further toward the thickest portion 11b side of the metal foil 11 than the end of the fiber reinforced plastic 13, whereupon the fiber reinforced plastic 14 is laminated such that a second step surface 11d is covered smoothly by the end portion of the fiber reinforced plastic 14. Likewise, an end of the fiber reinforced plastic 15 is disposed in a position deviating further toward the thickest portion 11b side of the metal foil 11 than the end of the fiber reinforced plastic 14, whereupon the fiber reinforced plastic 13 is laminated such that a third step surface 11e is covered smoothly by the end portion of the fiber reinforced plastic 15. Note that the fiber reinforced plastics 12 to 15 may be laminated after applying a paste adhesive or laminating a film adhesive to surfaces of the step-shaped structure of the metal foil 11 that come into contact with the fiber reinforced plastics 12 to 15.

A plurality of the elements 10 described above is laminated such that the step-shaped structures thereof are superposed in a thickness direction, as shown in FIG. 1. Alternatively, a required number of the elements 10 may be manufactured and then laminated such that the step-shaped structures thereof are superposed in the thickness direction, as shown in FIG. 1.

In FIG. 1, a length of the step-shaped joint surface is indicated by L.

When laminating the elements 10, a front and a back of the elements 10 may be counterchanged where appropriate, but as shown in FIG. 1, the metal foil 11 is preferably disposed to form the overall front and back, or in other words, the two outer surfaces, in the region in which the step-shaped structure is formed. When metal surfaces are disposed as the outer surfaces, greater strength is realized against an external impact.

Further, each of end positions of the step-shaped structures of the elements 10 is preferably disposed in alignment in order to reduce the length L of the step-shaped joint surface.

When the plurality of elements 10 has been laminated, the fiber reinforced plastics 12 to 15 of the respective elements 10 are thermally cured.

As a result, the metal foil 11 and the fiber reinforced plastics 12 to 15 are adhered to each other, and all the fiber reinforced plastics 12 to 15 are integrated.

Figure 3:
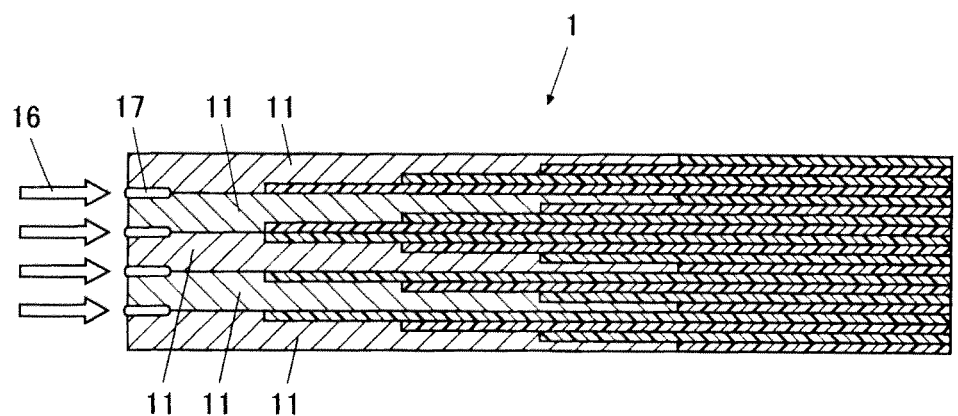
FIG. 3 is a sectional view showing inter-layer welding in the joint structure for a fiber reinforced resin and a metal according to this embodiment of the present invention.

Next, as shown in FIG. 3, adjacent metal foil 11 are welded to each other. As shown by arrows 16, a welding heat source such as a laser is emitted parallel to a joint surface between the metal foil layers 11 from an end surface of the metal foil 11 toward the joint surface such that a welded portion 17 is formed up to a deep position in each joint surface.

Figure 4:
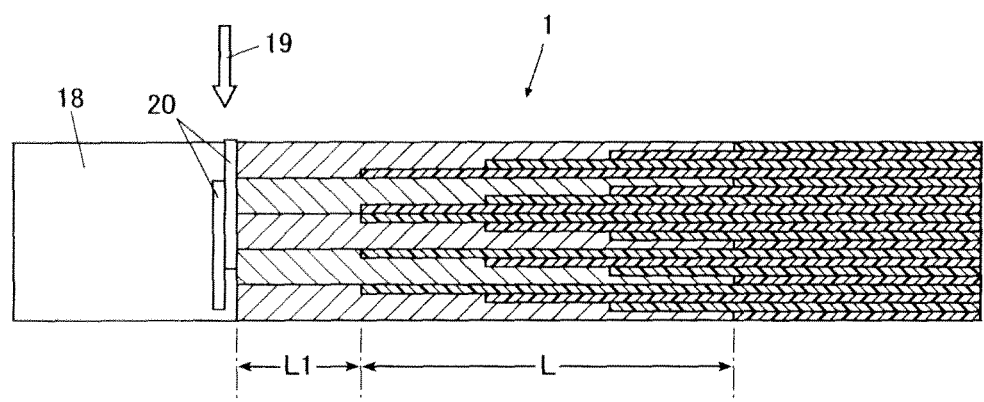
FIG. 4 is a sectional view showing end surface welding in the joint structure for a fiber reinforced resin and a metal according to this embodiment of the present invention.

If necessary, the end surface formed with the welded portion 17 is shaped by grinding or the like, whereupon an end surface of a metallic component 18 is mated with the shaped end surface and joined thereto by welding, as shown in FIG. 4. Likewise at this time, as shown by arrows 19, a welding heat source such as a laser is emitted parallel to a joint surface between the metal foil 11 and the metallic component 18 toward the joint surface such that a welded portion 20 is formed up to a deep position.

As is evident from the manufacturing process described above, the joint structure 1 for a fiber reinforced resin and a metal according to this embodiment is a joint structure for a fiber reinforced resin and a metal in which end portions thereof are joined via a step-shaped joint surface. A plurality of the single elements 10 each constituted by the metal foil 11, which includes the step-shaped structure having the end portion that gradually becomes thinner in the direction of the end surface of the end portion so as to form the step-shaped joint surface, and the fiber plastics 12 to 15, which are laminated such that the respective end portions thereof cover the step-shaped structure smoothly, are laminated such that the step-shaped structures are superposed in the thickness direction, whereupon the metal foil 11 and the fiber reinforced plastics 12 to 15 are adhered to each other and the adjacent elements 10 are joined to each other by the superposed surfaces thereof.

In the embodiment described above, each step-shaped structure is formed with three steps, but this is merely an example. The step-shaped structure is preferably formed with at least two steps. In a joint structure having a step-shaped joint surface, stress is concentrated in the end portion of each step. Therefore, by forming the step-shaped structure with a larger number of steps, stress concentration can be dispersed, leading to a reduction in maximum stress.

In the embodiment described above, five elements 10 are laminated, but this is merely an example, and three or more elements 10 are preferably laminated such that metal surfaces are disposed on the two outer surfaces, as described above.

By increasing the number of laminated elements 10, an adhesion surface area between the fiber reinforced plastic and the metallic material can be increased such that sufficient joining strength is secured even when the length L of the step-shaped joint surface is reduced. As long as a dimension L1 of the 100% metal end portion has a fixed distance that is suitable for the welding and so on described above, as shown in FIG. 4, the length L of the step-shaped joint surface can be reduced, and as a result, a volume occupancy of the fiber reinforced plastic can be increased, leading to a reduction in weight and so on.

Further, since the adhesion surface area between the fiber reinforced plastic and the metallic material is increased, an improvement in electric conductivity between the fiber reinforced plastic and the metallic material is realized.

In a conventional joint structure having a step-shaped joint surface, the step-shaped joint surface is constituted by one or two layers, and therefore, when peeling advances on the single layer step-shaped joint surface due to an impact load and a repetitive load such as a tensile load, compressive load, and bending load, the joint surface may become completely separated or peel away by substantially half such that the structure breaks. In the joint structure 1, on the other hand, the step-shaped joint surface is constituted by multiple layers, the size of the adhesion surface is increased, and the adhesion surface is formed from dispersed step surfaces disposed parallel to the outer surface from a shallow position to a deep position. Therefore, under equal load conditions, peeling either does not occur or can be limited to a part of the outer surface. Accordingly, the number of laminated elements 10 is preferably increased to three, four, five, and so on.

Carbon fiber reinforced plastic, glass fiber reinforced plastic, and so on may be cited as examples of the applied fiber reinforced plastic, but there are no limitations on the type of fiber reinforced plastic.

Further, a Ti alloy, an Al alloy, an Mg alloy, and so on may be cited as examples of the applied metallic material, but there are no limitations on the type of metallic material. Moreover, as long as a thermosetting resin is used, there are no limitations on the type of applied resin.

What is claimed is:

1. A joint structure for a fiber reinforced resin and a metal, comprising:
    a fiber reinforced plastic; and
    a metallic material including an end portion joined via a step-shaped joint surface to an end portion of the fiber reinforced resin,
    wherein a plurality of single elements each constituted by the metallic material which includes a step-shaped structure having an end portion that gradually becomes thinner in a direction of an end surface of the end portion so as to form the step-shaped joint surface, and the fiber reinforced plastic which is laminated such that respective end portions thereof covers the step-shaped structure, are laminated such that the step-shaped structures are superposed in a thickness direction,
    wherein the metallic material and the fiber reinforced plastic are adhered to each other,
    wherein adjacent elements are joined to each other by superposed surfaces thereof, and
    wherein a thinnest portion of the metallic material is disposed on outer surfaces in a region of the step-shaped structure.

2. The joint structure for the fiber reinforced resin and the metal according to claim 1, wherein adjacent metallic materials are joined to each other by welding.

3. The joint structure for the fiber reinforced resin and the metal according to claim 2, wherein the step-shaped structure includes multiple steps.

4. The joint structure for the fiber reinforced resin and the metal according to claim 1, wherein the step-shaped structure includes multiple steps.

5. The joint structure for the fiber reinforced resin and the metal according to claim 1, wherein end positions of the step-shaped structures of the elements are disposed substantially in alignment.

6. The joint structure for the fiber reinforced resin and the metal according to claim 1,
wherein thickest portions of the metallic material of the adjacent elements are adhered to each other in the thickness direction.

7. The joint structure for the fiber reinforced resin and the metal according to claim 1,
wherein thickest portions of the metallic material of the adjacent elements are in direct contact with each other in the thickness direction.

8. The joint structure for the fiber reinforced resin and the metal according to claim 1,
wherein the metallic material comprises at least a first portion and a second portion,
wherein the first portion includes the step-shaped joint surface,
wherein the second portion corresponds to the end portion of the step-shaped structure, and
wherein the second portion is thicker than the first portion.

* * * * *